United States Patent [19]

Grumet

[11] 3,779,492

[45] Dec. 18, 1973

[54] AUTOMATIC TARGET RECOGNITION SYSTEM

[75] Inventor: Alex Grumet, Whitestone, N.Y.

[73] Assignee: Grumman Aerospace Corporation, Bethpage, Long Island, N.Y.

[22] Filed: Oct. 18, 1971

[21] Appl. No.: 189,875

[52] U.S. Cl. .................................. 244/3.17, 356/71

[51] Int. Cl. .......... F41g 9/00, F41g 7/00, 42b 15/02

[58] Field of Search ............................ 244/3.17, 17; 350/3.5, 162 SF

[56] References Cited

UNITED STATES PATENTS

| | | | |
|---|---|---|---|
| 3,374,968 | 3/1968 | Toman | 244/3.17 |
| 3,614,035 | 10/1971 | Buynak | 244/77 |
| 3,636,330 | 1/1972 | Holeman et al. | 350/162 SF |

*Primary Examiner*—Benjamin A. Borchelt
*Assistant Examiner*—Thomas H. Webb
*Attorney*—Mellor A. Gill

[57] ABSTRACT

A coherent, optical signal processor for recognition of specific known targets at extremely high speeds, applying matched-filter techniques. A modified matched filter includes a pair of matched filters that will separately process the high and low spatial frequencies. By properly combining the outputs in a logical AND operation, the target may be interrogated for fine features as well as for correct size and shape. The optical memory bank of matched-filter pairs comprises known diffraction patterns of all resolvable views, in both azimuth and elevation, of the target, thus forming a target recognition comb-filter bank. All views of the recognition bank are simultaneously interrogated optically according to the diffraction pattern of the detected object to determine whether the detected object is the desired target as stored in any of the views in the memory bank.

20 Claims, 19 Drawing Figures

ALEX GRUMET
INVENTOR.

BY [signature]
ATTORNEY

ALEX GRUMET
INVENTOR
BY [signature]
ATTORNEY

ALEX GRUMET
*INVENTOR.*

BY [signature]
ATTORNEY

ALEX GRUMET
*INVENTOR.*

BY [signature]
ATTORNEY

ALEX GRUMET
*INVENTOR.*

BY [signature]
*ATTORNEY*

AUTOMATIC TARGET RECOGNITION SYSTEM

FIELD OF THE INVENTION

The present invention relates to target recognition systems, and has particular reference to coherent optical signal data processors using matched filter techniques for correlation identification.

DISCUSSION OF THE PRIOR ART

The problem of determining whether a specific target is present while rapidly interrogating target areas has not been solved in the past with acceptable false alarm and miss rates. This is true even when the target is clearly visible and not camouflaged. The high false alarm rate results from the inability of the prior systems to distinguish between the target and objects similar to the target. The high miss rate results from the fact that the memory of the recognition system is not provided with a sufficient number of target views to permit positive identification under varying target attitudes and illumination.

SUMMARY OF THE PRESENT INVENTION

The coherent optical processor of this invention overcomes both of these shortcomings, as will become evident in the detailed description to follow. Briefly, however, an image of the target area on a collimated coherent light beam is projected on a multi-beam generating hologram to produce a matrix of parallel output beams. Each output beam carries identical information concerning the target area in the form of the diffraction pattern produced by the entire target scene and every object therein. The parallel beams are directed to an optical memory bank in which are stored the many diffraction patterns a suspected target would produce if it were present in the target area when viewed under a variety of attitudes, viewing angles, and illumination. These diffraction patterns are memorized in a matched filter, high-low frequency air for each of said views and if the suspected target is present, the output of one matched filter pair (the autocorrelation) is significantly greater than that of all the others (cross-correlations). An inverse transform lens then brings this beam to a point focus in its back focal plane. All the light passing through the appropriate target filter is focused at this autocorrelation spot. For all nontarget imagery, however, the stored matched filter phase information is not conjugate (not matched), and light transversing the filter does not become collimated nor does it then focus to a point. Nontarget imagery, therefore, results in spread (unfocused) and weaker cross correlations at the output plane. The autocorrelation output is used to trigger some type of device, depending upon the apparatus in which the target recognition system is used. Such a device might be a simple alarm or a complex guidance system, for example.

In general, the low frequency part of the signal spectrum contains information related to gross target dimensions. If several nontarget objects of a size similar to the target's are present in the input film, they will be recognized as different from the target if, and only if, their fine detail features, which form the high frequency part of the spectrum, and different from those of the target. The recognition device is able to resolve these differences by using a logical AND gate operating on the low and high frequency parts of the spectrum as separate inputs. For the object to be identified uniquely as a target, the AND gate requires the object to be of correct size (low spatial frequencies) and to have the appropriate detail (high spatial frequencies). It will be evident that to further increase the target resolution capability of the system, the spatial frequencies could be divided into three or more parts instead of just two as described herein, provided, of course, that the target-generated frequency spectrum would contain more unique recognition information in the three or more frequency bands than it would in only the high and low portions.

It is known that the matched filter is the complex conjugate of the input signal spectrum and that its peak output represents a unique summation in space and time of all target-derived light passing through the filter. In the two dimensional optical case, all spatial frequency components of the incoming target spectrum have phase contributions entirely removed in passing through the filter, and the target-derived light exits from the filter as a collimated beam of light with an aperture of the diffraction pattern.

The matched filter provides excellent detection since the in-phase summation of all spatial frequency components in the target spectrum optimizes the peak signal-to-rms-noise ratio. If this peak signal is above the noise, a threshold can be set to permit the signal to trigger an alerting circuit. At any threshold setting, however, large unmatched inputs cause false alarms, which the standard matched filter is not able to cope with. False alarms represent an undesirable situation and are eliminated in the present invention through a split-spectrum technique.

The matched filter has enjoyed little success in prior target-recognition devices for two reasons: First, the matched filter was not designed to distinguish between the matched target and non-target objects, but rather to detect the target in a white noise background; and second, the film storing the optical matched filter has limited dynamic range. The very low target spatial frequencies that are useful in target evaluation saturated, and were not usually stored, in the filter.

Splitting the target into two partial spectra, covering the low and high spatial frequencies independently, as done in the present invention, circumvents these deficiencies. By properly combining the high pass and low pass filter outputs, the first of these deficiencies can be overcome to yield an efficient detector and a superior target recognition device. The second objection is overcome since the spectral amplitude variations of each partial spectrum can be made to fit separately within the dynamic range of the film.

BRIEF DESCRIPTION OF THE DRAWINGS

For a more complete understanding of the present invention, reference may be had to the accompanying drawings, in which.

DESCRIPTION OF THE PREFERRED EMBODIMENTS

Figure 1:
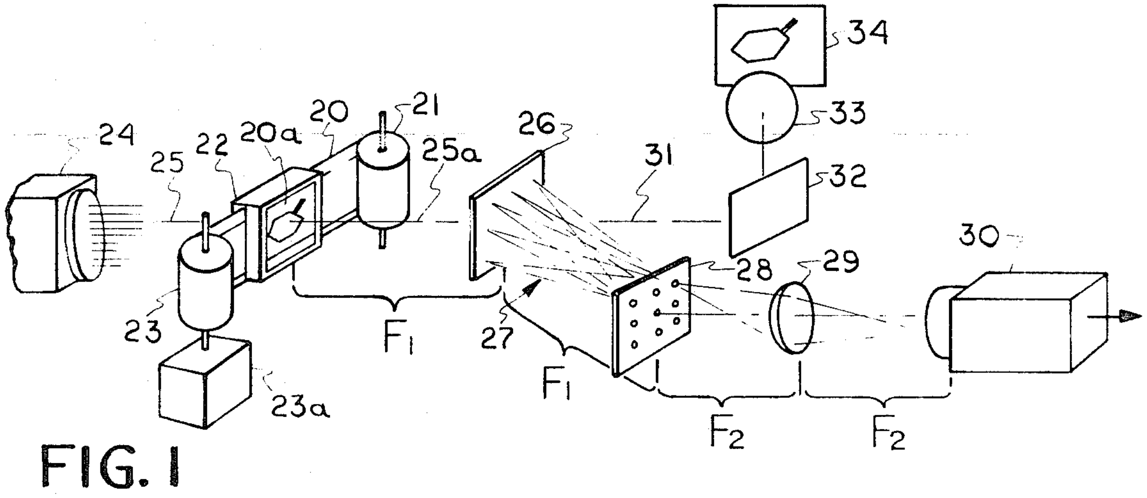
FIG. 1 shows the elements of one embodiment of the target recognition system.

With reference first to FIG. 1 of the drawings, there is shown an embodiment of the target recognition system for rapidly scanning a photographic serial reconnaissance film strip 20. Each frame 20a of this film strip is to be scanned to determine whether an object of known characteristics, i.e., a suspected target, is present in the area viewed. In the explanation to follow, the invention is described with relation to aerial reconnaissance and guidance, but this should not be considered as limiting the invention to these uses.

The film 20 feeds from the supply spool 21 between schlierenfree, optically-flat glass plates (not shown) into the optical gate 22 and onto the take-up spool 23, which may be driven by a motor 23A. The film feed rate is dictated by the characteristics of the readout mechanism (i.e., the frame rate of the T.V. vidicon camera in the system being described).

The coherent collimated light beam 25 from the monochromatic laser 24 is directed through the frame 20a of film 20 (as beam 25a) to a multiple beam generating holographic lens system 26. In passing through the aerial reconnaissance film, the laser beam becomes amplitude-modulated with the input imagery. Beam expansion of the laser 24 output may be required to ensure that the complete area of frame 20a is illuminated by beam 25, and beam reducing optics may be required between the film 20 and hologram 26 to compress the beam 25a to the area of the hologram. Neither of these optical devices is shown in FIG. 1, but their use is well understood, and if needed can be readily inserted.

The multiple beam generating hologram 26 replicates manyfold the incoming beam at its input. The output of the hologram 26 is a matrix of individually converging beams 27, all focused on plane 28 and having parallel axes, each beam carrying the information in the incoming beam 25a. A matrix of optical lenses could be used in place of the hologram 26 but the hologram is smaller, lighter, and particularly advantageous because of the large number of beams that can be generated. In addition, the multiple holographic lens has a common field of view for all lenses stored. It is presently contemplated that the output of the hologram 26 will be a 10-by-10 matrix of identical beams, but this is not to be considered as a limitation of the invention in any way. The parallel output beams 27 are directed against a matched filter memory bank 28, in which are stored the diffraction patterns of a great number of views of the suspected target from various viewing angles (in both azimuth and elevation) and under different conditions of illumination. When film 20 and memory bank 28 are spaced from the multiple holographic lens 26 by the focal distance $F_1$ of the hologram, the hologram 26 performs a Fourier transform of all the imagery on film 20. The individually convergent multiple beams 27 that are directed to the memory bank 28 are each one of the first order components of the output of the hologram 26, and the multiple beams constitute many replicas of the diffraction patterns of all the imagery on the input film 20. These are in register with and are to be compared with the diffraction patterns stored in the memory bank 28.

When the modulated light beam reaches the matched-filter memory bank, it arrives as axially centered, superimposed spectra of all objects in the input scene, at as many different locations as the imagery was replicated. At exactly these locations (addresses) in the memory bank are stored all pertinent views of the target to be detected. The storage at each location is in the form of the complex frequency spectrum in the diffraction pattern which would be generated by the target under specific conditions, such as position, range, and existing light. The output of the matched filter memory bank 28 is transmitted through a spherical lens 29 to the optical detector 30, which may be the front screen of a T.V. camera tube, as shown, or an array of solid state optical detectors, or any other optical-to-electrical detector. If the target is present in the input imagery, then a corresponding view stored in the memory produces the autocorrelation function of the target at the correlation plane, i.e., at the detector 30. All other objects in the input imagery result in cross correlations at the correlation plane. In other words, if the matched filter memory bank 28 recognizes the diffraction pattern of an incoming beam, the output of one of the matched filters is greater than that of any of the others, indicating that the suspected target has been located. The inverse Fourier transform of the product of the conjugate matched filter and the input imagery spectra is obtained at the detector 30 by means of spherical lens 29, when both the memory bank 28 and the detector 30 are situated at the focal length ($F_2$) of lens 29 in front of and behind the lens 29, respectively. This inverse Fourier transform is the correlation of the input imagery and the stored image. The autocorrelation is a match between the stored object and its input image and appears as a bright spot on the T.V. screen. Unmatched imagery results in weak, smeared cross-correlations.

The object being searched for may lie anywhere in the scene being observed by the matched filter will still be able to recognize its existence. The position of the correlation spot at the detector plane 30 is directly related to the position of the object in the scene, whence the location of the object can be pinpointed by noting the location of the correlation spot at the detector 30.

The zero order beam 31 through hologram 26 contains the pictorial image on the film strip 20 so that the target may be viewed visually by means of a mirror 32, image scaling lens 33 and screen 34 for example. Alternatively, not shown, a mirror may be inserted to deflect the beam 25a input to hologram 26, to a screen through a lens. After a target is located, the film 20 may be stopped for closer observation of the target area.

The description of FIG. 1 up to this point is essentially a description of present-day devices, with the exception of the application of the multiple holographic lens. The present invention departs from the system in FIG. 1 in another respect, in the provision for dual spectral range matched filters in the memory bank and the attendant circuitry that will be effective in improving the target recognition efficiency of the device, as will be made clear in the following passages.

Figures 2, 3, 4:
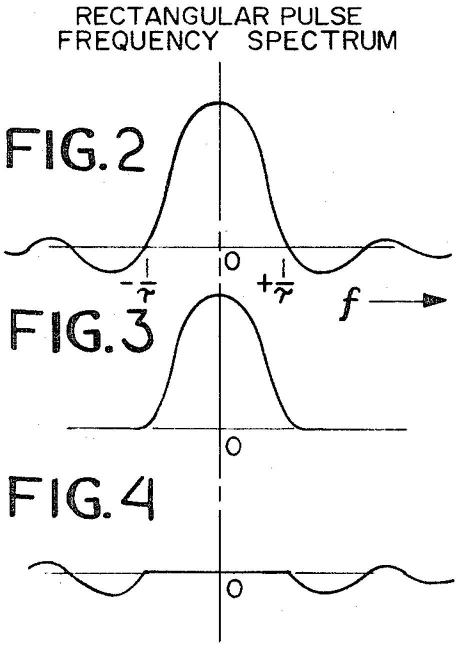
FIG. 2 shows the frequency spectrum of a rectangular pulse.
FIG. 3 shows the frequency spectrum of the low frequencies in FIG. 2.
FIG. 4 shows the frequency spectrum of the high frequencies in FIG. 2.
Figures 5, 6, 7, 8:
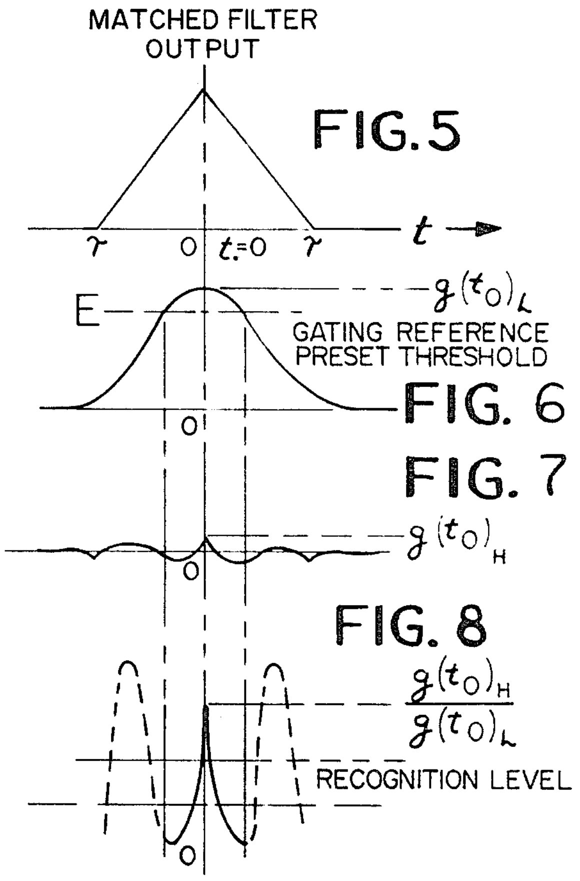
FIG. 5 shows the output of a filter matched to an input as in FIG. 2.
FIG. 6 shows the output of the low frequency matched filter with a rectangular pulse input.
FIG. 7 shows the output of the high frequency matched filter with a rectangular pulse input.
FIG. 8 shows the ratio of the values in FIG. 7 to those in FIG. 6.

FIG. 2 shows the spectrum of frequencies present in a one dimensional temporal rectangular pulse of width $\tau$. FIG. 5 shows the output of a filter, matched to all frequencies in the rectangular pulse, in response to an input composed of the frequencies in the spectrum of FIG. 2. FIG. 3 is the low frequency portion of FIG. 2 (cut off at $f = 1/\tau$), and FIG. 6 is the output of a matched filter of only these low frequencies of FIG. 3, in response to a rectangular pulse composed of all the frequencies in FIG. 2. FIG. 4 is the high frequency portion of FIG. 2, and FIG. 7 is the output of a matched filter of only those high frequencies of FIG. 4, in response to a rectangular pulse composed of all the frequencies in FIG. 2. FIG. 7 is distinctive in character, containing the unique information of the fine features of the nominally rectangular pulse, e.g., slope of sides and top. The low pass filter output, FIG. 6, indicates relatively general information such as overall size and shape of the rectangular pulse.

The output of both low and high pass matched filters is required to recognize the signal, because the total signal information is divided between these two filters. Therefore, the filter outputs represented by FIGS. 6 and 7 must both be used. The low pass output, e.g., FIG. 6, by rising above a preset threshold E, can indicate that a signal of the correct width and/or amplitude is present at the input. However, any number of unwanted signals present at the input may also rise above the output threshold and incorrectly trigger the output. The discrimination between the wanted and unwanted signal resides in the high pass filter output. The high pass matched filter will, therefore, provide additional discrimination, thus reducing false alarms.

A very large unwanted signal may result in a larger output in both the low and high pass matched filters. However, the ratio of the high to low frequency output (see FIG. 8) will generally be lower. In addition, the value at time $t_0$ for the low and high frequency filter outputs will, in general, not be the same for the unmatched signal. A coincidence ratio circuit (FIG. 9) or an automatic gain control (AGC) circuit (not shown) may be used to combine the outputs of the two filters in the proper manner to eliminate actuation by the unwanted signals.

Figure 9:
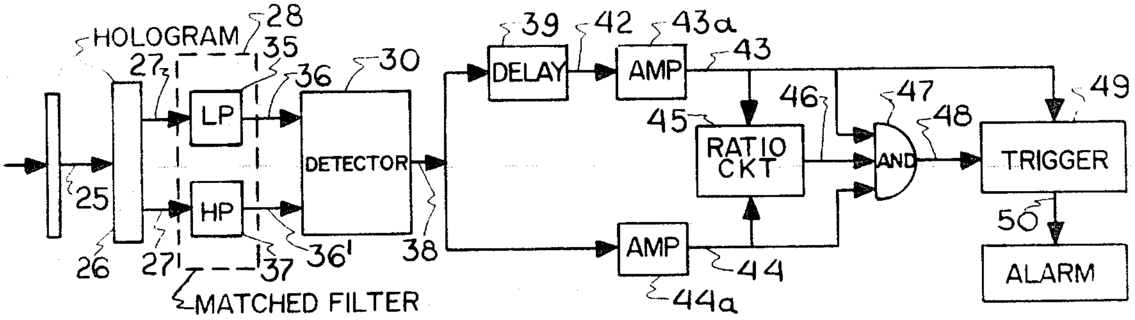
FIG. 9 shows one logic circuitry for combining the outputs from the high and low frequency matched filters.
Figure 10:
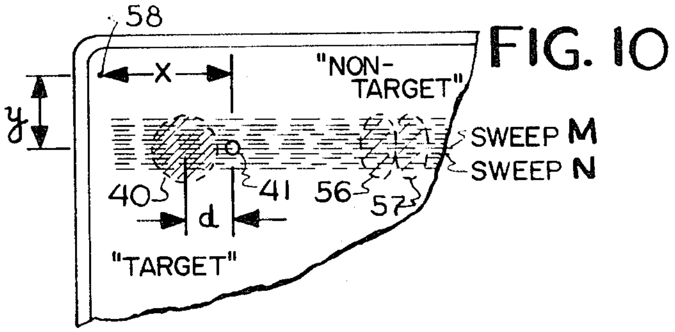
FIG. 10 illustrates the output of the matched filter on the optical detector.

Typical circuitry by which the optical autocorrelation signal is converted to an electronic triggering signal for activating alarm devices is shown in FIG. 9. The light beam 25 from film 20 to hologram 26 is split into many identical beams 27, of which two are illustrated, one being directed to the low pass matched filter 35 and the other to the high pass matched filter 37 in the matched memory filter 28. These particular filters 35 and 37 are a high and low matched filter pair for an identical target orientation and produce the autocorrelation output beams 36, 36', which arrive at the screen of the detector 30 with a fixed horizontal separation, as illustrated in FIG. 10. The low pass filter 35 output is a broad area of illumination 40 and the high pass filter 37 output is a concentrated spot 41 of bright light, displaced a fixed distance, d, to the right of the center of area 40. The relative amplitude of these output spots may be independently adjusted in the fabrication of the matched filters. Cross correlation outputs from other filters in the memory 28 might show up as two broad areas of low level illumination 56, 57 at the screen of detector 30, for example.

Figure 11:
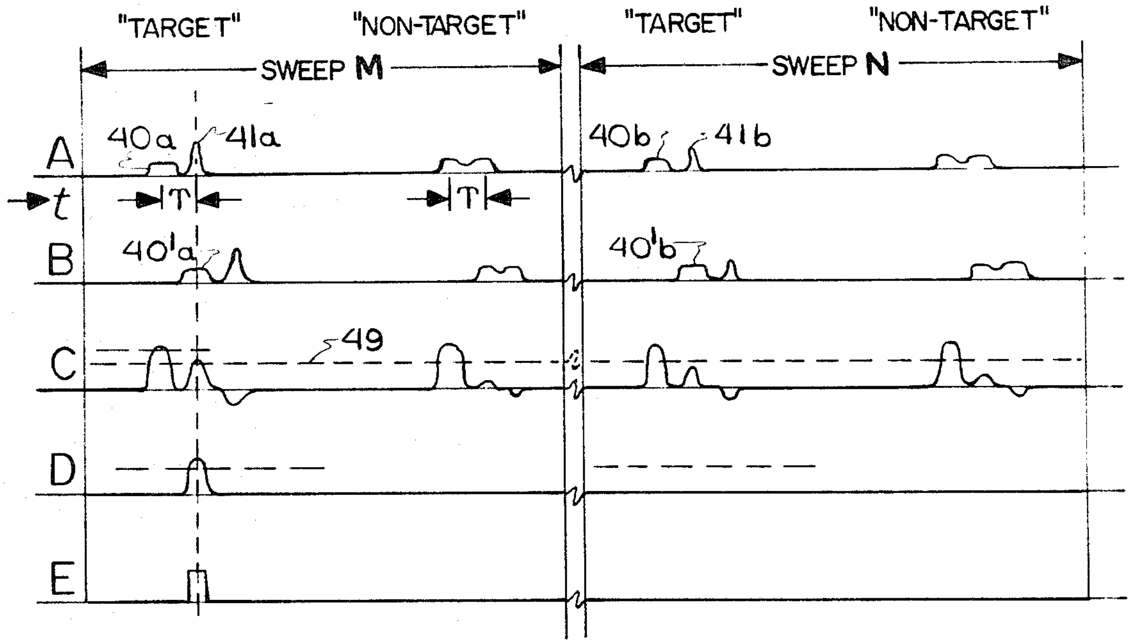
FIG. 11 illustrates the electrical signals appearing at various portions of the circuit in FIG. 9.

As the electronic beam of detector 30 scans the illuminated screen, an output voltage is generated at line 38 such as that shown in trace A of FIG. 11, for example, taken over two sweeps M and N, not necessarily successive sweeps. The broad pulse 40*a* in sweep N corresponds to area 40, and the peaked pulse 41a corresponds to spot 41. (In sweep N the pulses 40*b* and 41*b* similarly correspond to area 40 and spot 41.) the pulse 41*a* is displaced from pulse 40*a* by a time interval, T, which is determined by the physical displacement, *d*, between the area 40 and spot 41.

The signal at line 38 is delayed in circuit 39 by a time interval equal to T so that the output of circuit 39 appearing at line 42 can be represented by trace B of FIG. 11. The peak 40*a'* occurs at line 42 at the same instant that peak 41*a* appears at line 38. These signals are amplified in amplifiers 43*a* and 44*a*, and the outputs thereof at lines 43 and 44 are applied to the inputs of ratio circuit 45. The output of circuit 45 at line 46 is shown in trace C of FIG. 11, and is proportioned to the ratio of the amplitude of trace A to the amplitude of trace B. At the instant corresponding to the peak 41*a* on trace A, the output at line 46 is proportional to the ratio of high frequency output to low frequency output of the matched filter 28. The signal at lines 43, 44, and 46 are applied to the AND gate 47, which produces an output signal at line 48 only when siignals appear at each line and only when the level of the signal at line 46 exceeds a minimum value 49, as shown in trace C of FIG. 11. It will be seen that during sweep N the peaks 40*b* and 41*b* of trace A in FIG. 11, corresponds to spots 40 and 41. The signal of trace C during sweep N does not reach level 49 so that there is no output from AND gate 47. The signal at line 48 appears as that in trace D, producing a pulse at line 48 during sweep M but not during sweep N.

The signal 48 activates the Schmitt trigger 49, producing an output pulse, as shown in trace E of FIG. 11, at line 50. Since the amplitude of the pulse in trace D depends upon the ratio of the amplitude of pulse 40*a* and 41*a*, it is independent of the illumination in the scene on film 20.

The optical signal from any pair of filters falls at a specific, unique location on the screen of detector 30. The particular filters which generated spot 41 may be identified by the location of spot 41 with respect to a reference point 58 (FIG. 10). Thus the *y* distance of spot 41 from point 58 is determined by the sweep M at which pulse 41a occurs; the distance is determined by the time interval from the beginning of sweep to the pulse 41a. The target is then established as that in the filter so identified. If the particular filter that recognized the target need not be identified, all filter outputs may be superimposed at the detector 30. Whenever any filter delivers a large enough singal out of the AND gate, the detector will activate the circuit, indicating that the target has been located.

Figure 12:
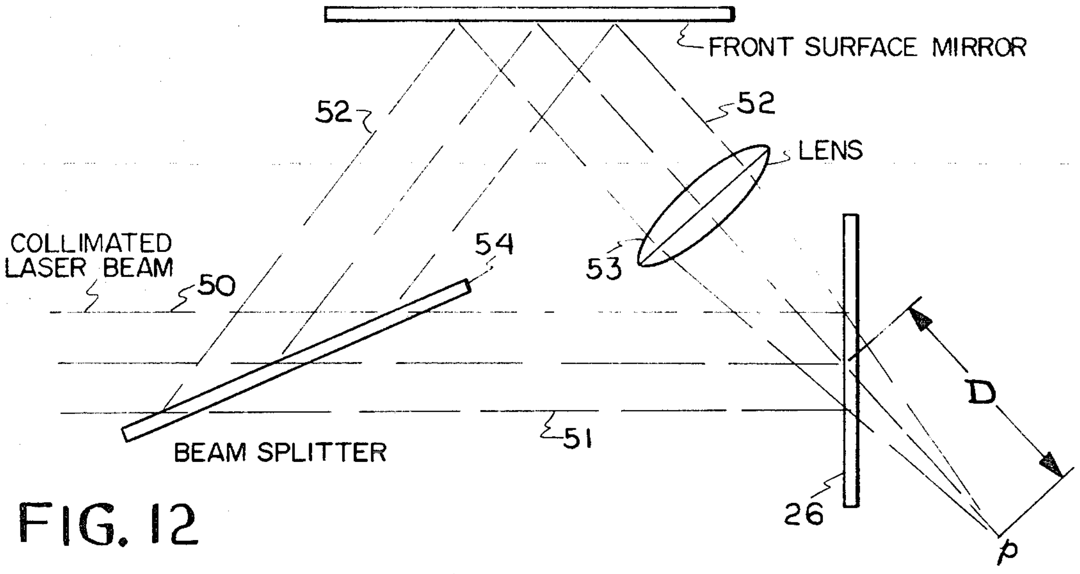
FIG. 12 illustrates the preferred method of fabricating the multiple beam generator.

FIG. 12 illustrates the preferred method for fabricating the multiple beam generating hologram 26. The reference laser beam 51 is applied directly to the undeveloped film 26, while the signal beam 52 is applied obliquely to film 26 afer passing through the lens 53. The beam 52 is focused by lens 53 at a point *p* located at a distance D beyond the plane of the film 26 as measured along the optical axis of lens 53. Each beam 51, 52 is adjusted for equal irradiance on the film 26 (by attentuating means, not shown), and the film is exposed for the proper interval as required by film speed and strength of illumination. After one exposure, the film 26 is indexed in its own plane by a small amount to a new position and is exposed again to beams 51 and 52.

This procedure is repeated many times, each time indexing, either horizontally or vertically, the film 26 in uniform steps to produce a uniform raster of exposed positions on the film 26. The multiply exposed film 26 is then developed in a conventional manner to produce a multiple beam generating hologram having a focal length D and being capable of dividing a single collimated input signal beam into a number of identical parallel convergent output beams.

Figure 13:
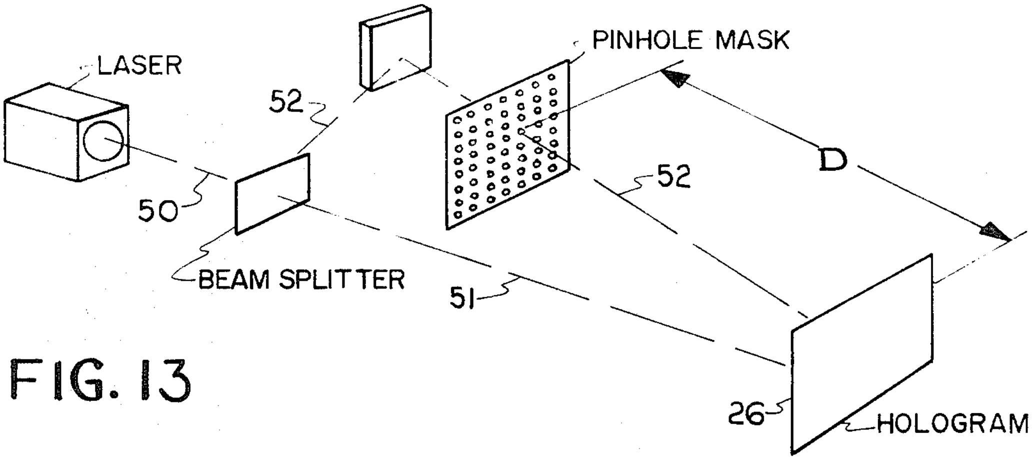
FIG. 13 is a modification of FIG. 12.

In an alternative arrangement, as in FIG. 13, the reference beam 51 is applied directly to film 26 while the signal beam 52 is applied to film 26 after passing through an aperture mask 53. The mask 53 contains a plurality of closely spaced pinhole apertures arranged in a uniform matrix. The film 26 is separated from the mask 53 by a distance D, which becomes the focal distance of the hologram.

Figure 14:
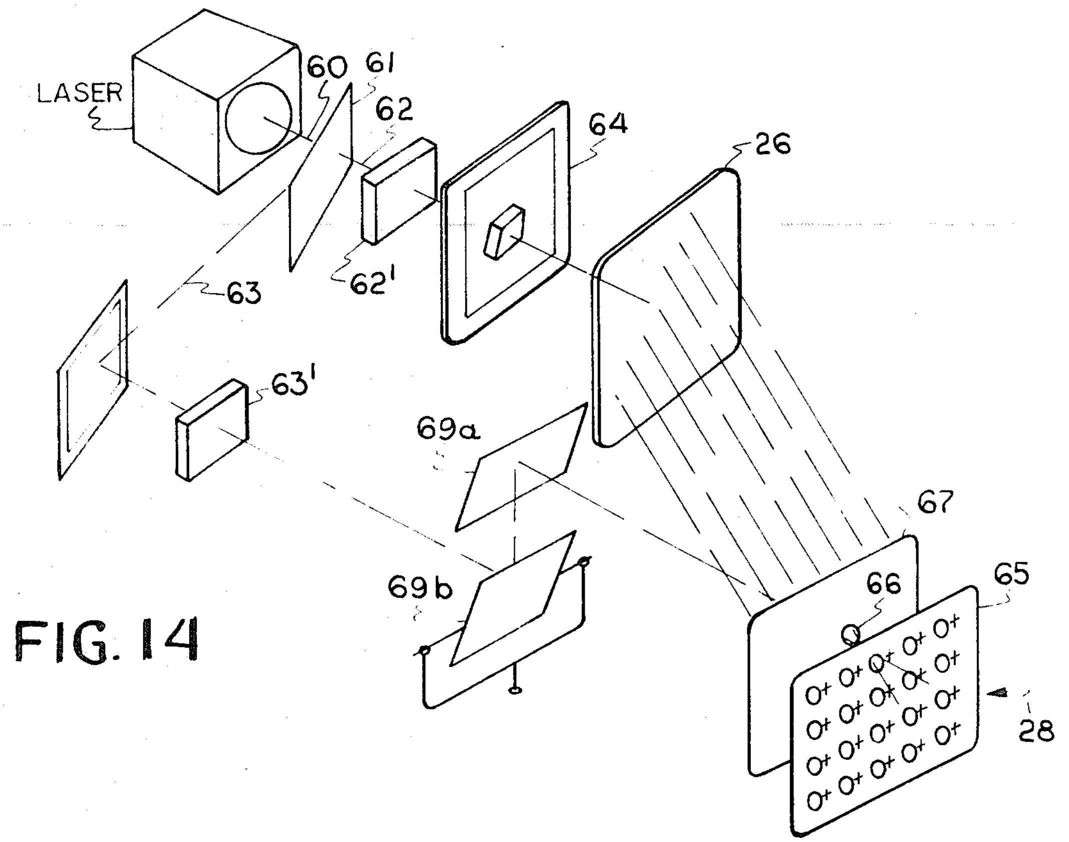
FIG. 14 shows one method of fabricating the matched filter memory.

FIG. 14 shows the preferred method and apparatus for preparing the memory bank 28. A laser beam 60 of coherent aollimated monochromatic light is split in the beamsplitter 61 into a signal beam 62 and a reference beam 63. Signal beam 62 is modulated in the film transparency 64 according to the view of the target to be memorized, and is applied to the memory bank film 65 after passing through the multiple beam generating hologram 62 and a single aperture 66 in mask 67. The reference beam 63 is applied to the film 65 by reflection from a pair of mirrors 69*a* and 69*b* and through the aperture 66. Variable attenuators 62' and 63' are interposed between the beam splitter 61 and the film 65, for reasons to be explained.

The transparency 64 of the known target is replicated as a diffraction pattern at the memory bank plane as many times as there are multiple beams emanating from the hologram 26. The mask 67 is positioned opposite memory bank 65 so as to allow only one of the beams from hologram 26 to impinge on film 65.

The energy in the information beam varies with the frequency, being high for the lower frequency spectrum and low for the higher frequency spectrum. In order to produce a high contrast interference pattern, the energies in the reference and information beams should be comparable. Thus, for recording the low frequency pattern, the reference beam 63 energy is kept high, while the information beam 62 energy may be attenuated in attenuator 62', resulting in a very weakly recorded, high frequency pattern.

After recording the low frequency pattern (shown as a circular area in FIG. 14), the mask 64 is indexed horizontally to uncover the region of film 25 on which the high frequency pattern of the same target view is to be recorded. For recording the high frequency pattern (shown as a cross in FIG. 14) and to blank out the low frequency portion only, the reference beam 63 energy is attenuated by attenuator 63' and the film is overexposed. The high frequency filter is overexposed to insure that the high amplitude, low frequency signals saturate the film emulsion. The total energy in both cases should be similar. In summary, the exposure time is kept short when energy is high, as when preparing the low frequency filter, and the exposure time is increased when the energy is low, as when preparing the high frequency filter.

After the view in transparency 64 is recorded in both high and low frequency patterns, the transparency is changed, and another view of the target is recorded at two other adjacent addresses in the film 65 in a similar manner.

Although FIGS. 13 and 14 show provisions for making the high and low frequency matched filters in side-by-side relationship for T.V. processing, other spatial arrangements may be used for both T.V. and other types of electrooptical detectors.

The low frequency pattern may remain relatively constant for rather large changes in the target aspect, but the high frequency pattern will change considerably. A number of high frequency patterns can be recorded superimposed at the same address in the memory bank without confusion by slight angular displacement between views. As many as nine views have been recorded at a single position, thus increasing the number of views that can be stored at a single memory address. By this superposition device, with 20 superimposed fillers at each address, more than a thousand different views of the target can be stored on a 30 × 10 matrix.

The matched filter places critical constraints on the size and orientation of the incoming imagery relative to the matched filter. In the past, matched filter devices attempted to overcome misorientation by rotating the matched filter but this approach has two shortcomings: (1) the filter must be located on the optical axis and any rotational requirement makes this difficult to maintain, and (2) the matched filter and input target image must be at the corresponding oblique view in azimuth and elevation.

The difficulty in recognizing the target at an orientation different from that stored in the matched filter is avoided by storing in memory all resolvable views of the target. The incoming imagery is divided into many identical replicas, and all replicated images are simultaneously processed through a filter storing all uniquely resolvable views of the target, under a variety of illumination conditions if necessary. Thus the possibility of missing the target is sharply reduced.

In preparing the matched filter as a recognition comb-filter, the −3db crossovers do not occur at constant increments in azimuth and elevation angle but are functionally related to target aspect. When the azimuth angle is slightly changed in broadside view, the appearance of the target does not alter drastically, nor does its diffraction pattern change appreciably. However, when the azimuth angle is changed through a like angular increment in end view, both the appearance and diffraction pattern of the target change considerably. Thus, a smaller number of larger angular increments are required to cover the target from broadside viewing locations than from end viewing locations.

The criterion for appropriate angular increment indexing between any two views is the reduction of the matched filter output to one-half of its maximum. It has been found that under this criterion no two adjacent views need be closer than 6°. As stated above, the optical memory bank is a target recognition comb-filter with −3db crossovers in azimuth and elevation views. When the desired target is presented at the input in any possible view, therefore, one of the matched filter pairs in memory will have a maximum output.

For many tactical situations, fewer than 1,000 target views, or 2,000 high/low filter pairs will be required. When high resolution film is used, the matched filters can be made physically small. Furthermore, a number of matched filters can be physically superimposed and still provide unique address to the interrogating beam by means of the phase information unique to each filter. The entire matched filter memory for the target is easily accommodated in an active area occupying only one square inch.

It is known that when constructing a hologram, two light beams (one a signal beam, the other a reference beam) intersect at the hologram and produce changes in the film emulsion which become permanently recorded when the hologram is developed. In playback, the developed hologram is illuminated by one beam only, and the other beam is generated. Thus, if the angle of incidence of the signal beam during construction and the illuminating beam during playback are the same, the beam generated during playback will have the same angle of incidence as the reference beam had during construction, i.e., the direction of the reference beam controls the direction of the generated beam.

It will be seen, therefore, that the output of a particular filter in memory 28 can be directed to a specific spot at the pickup plane of detector 30 by controlling the direction of the reference beam appropriately. To this end, the reference beam 63 is reflected off a pair of front surface mirrors **69*a*, 69*b* of which one mirror is fixed 69*a* and the other 69*b*** is adjustable about two axes.

In this way the outputs of memory 28 can be directed to prescribed positions at the detector 30, i.e., to a specific row and column of an output matrix, even though the filters in the memory are not correspondingly placed. Also, since the temporal separation of the peaks, e.g., **40*a* 41*a* in the detector output, is directly related to the spatial separation of the light spots on detector 30, i.e., the correlation outputs of the high and low frequency filters at the correlation plane, these outputs must be accurately spaced to permit electronic processing through the electronic circuitry, such as shown in FIG. 9. This separation can be accurately achieved by the method described above, with detents for precisely setting the position of mirror 69*b*.** It should be noted that the spacing between the high and low filter output locations for a particular target adjacent high-low pairs to avoid false coincident gating of the low of one pair and the high of a neighboring pair.

Figure 15:
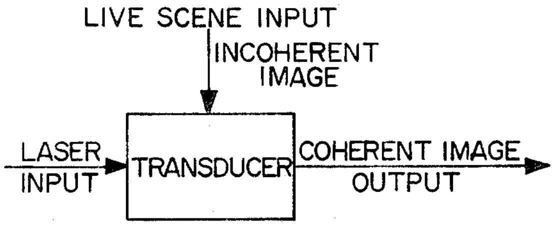
FIG. 15 shows a live scene transducer.

In the description of the preferred embodiment just completed, the scene under observation had been recorded on a photographic film, such as might be obtained during aerial reconnaissance. This invention, however, is not to be limited to activities which might be carried on at support bases but may be employed as well for live target recognition in real time or for active guidance of aircraft along a prescribed track to a specific destination. For such purposes, the film 20 is supplanted by a live scene transducer (FIG. 15), which transforms the uncoherent target image into a coherent image. Such devices may allow the incoherent image to amplitude modulate a laser beam, resulting in a coherent image through modulation of (1) a transmission medium, or (2) a reflecting surface, for example. The modulator may contain photochromic material, or variable refractive index crystals when viewing the scene directly through a lens system, or may employ scanning sensor techniques when viewing the scene indirectly through a video system.

The transducer or the method whereby the transformation is accomplished is not pertinent to the present invention. The important consideration is that the input to the multiple beam generating hologram 26 be an amplitude modulated, coherent, collimated monochromatic image of the incoherent, polychromatic, uncollimated light energy reflected from or emitted by the observed area. Suitable transducers are commercially available and have been thoroughly described in the literature, so that further description is not needed here.

It will be recognized that when the scene is viewed live, the movement of the observer over the scene will result in movement of the images 40,41 across the cathode ray screen. This movement can be employed to control a navigational system (FIG. 16), guiding the vehicle to a desired target of for maintaining a fixed course for instance. For this purpose, the memory 28 is prepared in a special manner as will be described.

Figure 17:
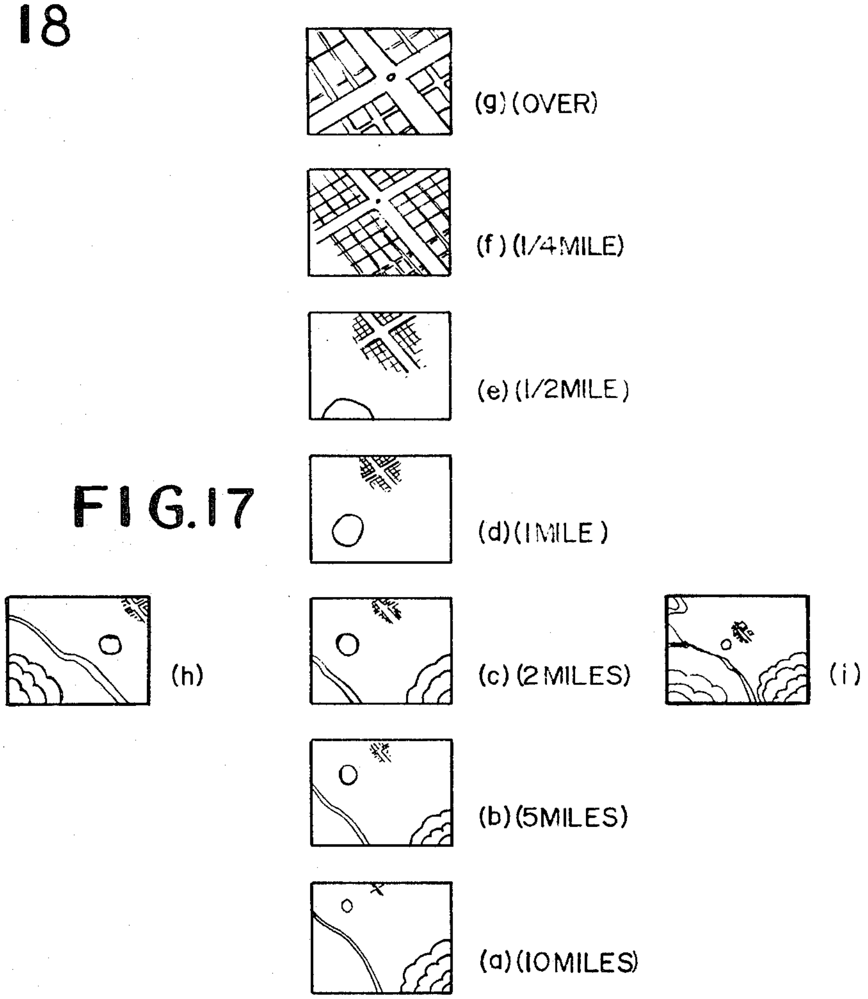
FIG. 17 shows a sequence of scenes viewed from a moving vehicle.

FIGS. 17(*a*) through (*g*) illustrate the line near which would be seen by the vehicle as it travels on track toward the target in FIG. 17 (*g*). For illustrative purposes, the distance at which such scenes are memorized might be 10, 5, 2, 1, ½, ¼, and zero miles for scenes 17(*a*) through (*g*), respectively. FIG. 17(*h*) represents the scene that would be observed from a vehicle that is off course to the left or the desired track and as a distance of 2 miles from the target. The scenes are assumed to be viewed from a known altitude.

Figure 18:
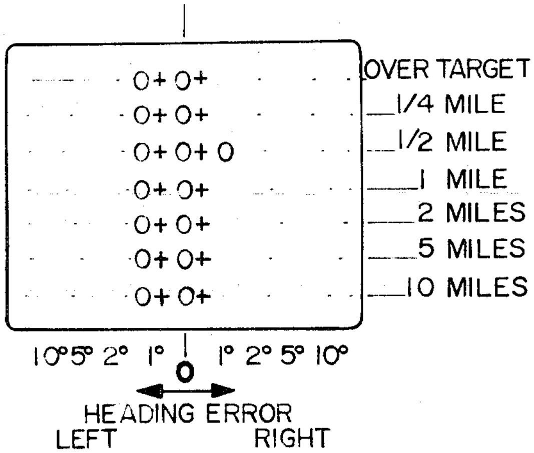
FIG. 18 illustrates a matched filter for guidance control.
Figure 19:
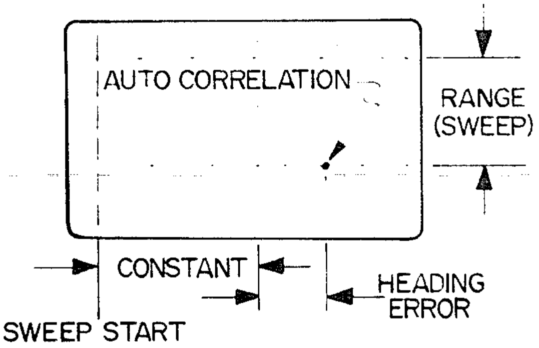
FIG. 19 is an explanatory diagram of the detector input.

The memory 28 shown in FIG. 18 are matched filter pairs corresponding to the scenes in FIG. 17 arranged in regular order, with range decreasing from bottom to top.

Thus, the central column of matched filters record the news of the target from the vehicle as the vehicle proceeds on-track. The upper rows record the views as seen when the vehicle is near the target, the lower rows as seen from the vehicle when far removed from the target. The columns to the left and right of the central column record the views of the target as seen from the vehicle to the left or right of the desired track. The column closest to the central column represent a small angular heading error, those to the edge of the memory 28 represent a large heading error. The columns at the left and right are generally used for acquisition and may not be necessary if the vehicle is not far removed from the desired track. For normal excursions from the true track, the correlation spot moves off the central axis and can be used for course correction.

As the vehicle proceeds toward the target, the view of the target, changes in position and size as the range decreases. The live view is processed through the target recognition system, and autocorrelation with a matched filter produces a concentrated spot on the detector 30 as described above. As the range decreases, the position of the target in the view changes, and the size of the target increases. The autocorrelation spot fades into cross correlation, and a new matched filter produces a new autocorrelation spot, which moves upward on the screen as the vehicle proceeds on its course. The heading error is indicated by the position of the spot on the screen, and the displacement thereof from the center of the screen may be used to activate an automatic navigation control system to alter the course of the vehicle to bring it back to the desired track, and to return the spot to the center of the screen.

Figure 16:
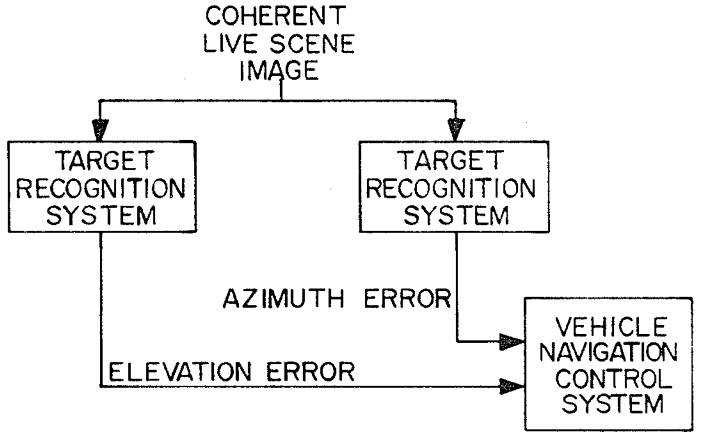
FIG. 16 illustrates the basic components of a guidance control system.

Similarly, the scenes of FIG. 17(*a*) through (*g*) represent the regions which would be viewed from the predetermined altitude, while the view from the same geographical position but higher or lower altitude would encompass more or less of the region. FIG. 17(*i*), for example, shows the view which would be seen at a distance of 2 miles from the target at a higher altitude than that of FIG. 17(*c*). It will be understood that a complete matrix of matched filters will be needed for both course control and altitude control although only one view other than the central column is shown for each. As shown in FIG. 16, the complete navigation system uses two target-identification devices, one in the course control circuit and another in the altitude control circuit.

It should be recognized that the target recognition system of this application is in its broadest sense an object recognition device that can be applied in many different ways. Although the invention has been described as embodied in an aerial reconnaissance system, using filmed or live observation, and in a guidance and navigation system, the invention has much wider use. For example, whenever any one object must be distinguished and positively identified according to its known characteristics this invention can be used to advantage. The targets, or objects to be recognized might be written or printed characters (for use in mail and check sorting) or biological entities in animal tissues and fluids (for use in medical diagnosis), or the products of manufacture (for one hundred per cent inspection of the production ), or fingerprints (for criminal identification). Many other applications will occur to experts in the possible fields of use. Some applications can use the filmed image (where the objects are stationary), others must use a transducer for observations. Thus, while the invention has been described with reference to particular embodiments, many modifications and variations may be made in form and detail without departing from the spirit of the invention as defined in the appended claims.

Having thus described my invention, what I claim is:

1. In a device of the character described for automatically recognizing the presence of a given object in a region under observation, means for storing light variations in said observed region, a source of coherent, collimated light energy, means for modulating said light energy amplitude according to said stored light variations, optical means for transforming said amplitude modulated light energy into an unidentified diffraction pattern generated by said modulated light energy, memory means including a plurality of different matched filter means containing a known diffraction pattern produced by said given object under known conditions, each of said matched filter means comprising at least two matched filters, severally matched to a preselected band of the spatial frequencies comprising said known diffractional pattern, optical means for interrogating said memory means with the unidentified diffraction patterns of said modulated light energy, and detecting means for producing an output signal whenever correlation of said unidentified diffraction pattern with all of said matched filters in any one of said matched filter means exists.

2. The device as described in claim 1, wherein the means for storing said light variations includes a photographic transparency of the given region, and the optical means for generating the diffraction pattern includes a lens system, said transparency being situated at the front focal plane of said lens system and said memory means being located at the back focal plane of said lens system.

3. The device as described in claim 2, wherein said lens system includes means for generating a multiplicity of identical outputs at said memory means for simultaneously interrogating all of said matched filter means.

4. The device of claim 3, wherein said lens means comprises a hologram.

5. The device of claim 1, in which each of said matched filter means includes a pair of matched filters, one being a high frequency pass filter and the other being a low frequency pass filter.

6. The device as described in claim 5, in which said plurality of matched filters is arranged in a regular geometric array, the low pass filter of every filter pair occupying the same relative position with respect to the corresponding high pass filter.

7. The device as described in claim 5, wherein one low pass filter is common to a plurality of high pass filters.

8. The device as described in claim 7, wherein said plurality of high pass filters are superimposed on one another.

9. The device as described in claim 1, wherein the optical means for interrogating said memory means includes means for generating multiple identical diffraction patterns from a single light modulated input for simultaneously interrogating all of said matched filter means in said memory means.

10. The device as described in claim 9, wherein said multiple diffraction pattern generating means is a hologram.

11. The device as described in claim 1, wherein said means for storing light variations includes a transducer for real time observation of said region.

12. The device in claim 1 wherein said given object may be any one of a plurality of preselected objects and said memory means includes a plurality of matched filter means containing diffraction patterns produced by each of said plurality of preselected objects, whereby said given object also can be identified as one of said preselected objects.

13. In an automatic navigation system for guiding a vehicle over known territory along a predetermined course,
- observing means on said vehicle for viewing that portion of said territory which is located at a known direction in relation to said vehicle,
- storing means for storing light variations reaching said observing means as said vehicle proceeds over said territory,
- memory means including a plurality of matched filter means, each filter means containing the diffraction pattern produced by the observed view when said vehicle is at a predetermined position, and altitude,
- a source of coherent, collimated light energy,
- modulating means for modulating said light energy amplitude according to said stored light variations,
- optical means for transforming said amplitude modulated light energy into a diffraction pattern,
- optical means for interrogating said memory means with the diffraction pattern generated by said modulated light energy,
- detecting means for producing a signal whenever correlation exists between said generated diffraction pattern and one of said matched filter means,
- means responsive to said signal for producing an error signal indicative of the difference between the actual course of said vehicle and the predetermined course, and
- means on said vehicle to change the course of said vehicle to reduce said error signal to zero.

14. The device in claim 13, in which each of said matched filter means comprises at least two matched filters, severally matched to a preselected band of spatial frequencies comprising the diffraction pattern.

15. The device in claim 13, in which the matched filters of said memory device are arranged in sequential order representing views as observed along the predetermined course.

16. The device as described in claim 13, in which said error signal-producing means produces a second error signal indicative of the difference between the actual altitude of said vehicle and the predetermined altitude, and
- including means on said vehicle to change the altitude of said vehicle to reduce said second error signal to zero.

17. In a method for recognizing a given object, the steps of
- obtaining the diffraction pattern representative of a predetermined view of a known object,
- memorizing said diffraction pattern in a pair of high pass and low pass optical matched filters,
- repeating said steps until a plurality of diffraction patterns representing a plurality of views of at least one known object are memorized in a plurality of matched filter pairs,
- obtaining the diffraction pattern of said given object to be recognized,
- comparing the diffraction pattern of said given object with each of the diffraction patterns memorized in said high and low pass matched filter pairs, and
- recognizing said given object when correlation exists between the diffraction pattern of said given object and one of said matched filter pairs as being similar to the known object from which said one matched filter pair was made.

18. The method described in claim 17, in which the step of obtaining the diffraction pattern of said object to be recognized includes the steps of
- photographing said object and preparing a transparency of the photographed image,
- placing said transparency at the front focal plane of a lens,
- transmitting laser light through the transparency,
- placing said matched filter pairs at the back focal plane of said lens, whereby the diffraction pattern of said object is obtained at the matched filters.

19. The method described in claim 17, in which the step of
- recognizing is accomplished automatically by
- placing said matched filter pair at the front focal plane of a lens system, and
- placing an optoelectrical pickoff device at the back focal plane of said lens system, and
- connecting an electrical system to said optoelectrical pickoff.

20. The method described in claim 17, in which the step of obtaining the diffraction pattern of said object to be recognized includes the steps of
- storing an image of said object in a real time transducer,
- amplitude modulating a laser beam according to the image stored in said transducer, and
- obtaining the diffraction pattern of said amplitude modulated laser beam.

* * * * *